(12) United States Patent
Basile et al.

(10) Patent No.: US 7,755,980 B2
(45) Date of Patent: Jul. 13, 2010

(54) COPY PROTECTION OF OPTICAL DISCS

(75) Inventors: Carmen Laura Basile, Maidenhead (GB); Richard A. A. Heylen, Reading (GB)

(73) Assignee: Rovi Solutions Corporation, Santa Clara, CA (US)

( * ) Notice: Subject to any disclaimer, the term of this patent is extended or adjusted under 35 U.S.C. 154(b) by 659 days.

(21) Appl. No.: 11/732,654

(22) Filed: Apr. 4, 2007
(Under 37 CFR 1.47)

(65) Prior Publication Data

US 2008/0247289 A1  Oct. 9, 2008

(51) Int. Cl.
*G11B 21/08* (2006.01)
(52) U.S. Cl. .............. 369/30.03; 369/47.12; 369/53.21
(58) Field of Classification Search .................. None
See application file for complete search history.

(56) References Cited

U.S. PATENT DOCUMENTS

| 2002/0076046 A1 | 6/2002 | Heylen |
| 2005/0185926 A1 | 8/2005 | Basile et al. |
| 2005/0259546 A1 | 11/2005 | Basile et al. |

FOREIGN PATENT DOCUMENTS

| WO | WO 00/74053 | 12/2000 |
| WO | WO 01/61695 | 8/2001 |
| WO | WO 01/61696 | 8/2001 |
| WO | WO 02/11136 | 2/2002 |
| WO | WO 2005/081245 A2 | 9/2005 |

OTHER PUBLICATIONS

International Search Report for International Appl. No. PCT/US2008/003618 mailed Jul. 23, 2008, 1 page.

*Primary Examiner*—Paul Huber
(74) *Attorney, Agent, or Firm*—Andy T. Pho

(57) ABSTRACT

The more effective is the copy protection provided on a DVD, the greater is the likelihood that the copy protection will adversely interfere with legitimate uses of the disc. In a disc where the content is arranged in physical sectors, it is now proposed to provide subversive regions on the disc having a similar structure to genuine regions. A subversive region and a genuine region will each extend over one or more physical sectors. The subversive region will be provided with physical sector addresses which coincide with addresses of the genuine region. Navigational data will ensure that it is the genuine, rather than the subversive, region which will be accessed during normal play, but the subversive region will effectively hide the genuine region during copying.

16 Claims, 12 Drawing Sheets

COPY PROTECTION OF OPTICAL DISCS

BACKGROUND TO THE INVENTION

The present invention relates to a method of copy protecting an optical disc carrying content and control data arranged in physical sectors. The invention also relates to a method of copy protecting such an optical disc and to an instruction set for use in copy protecting an optical disc.

There are many techniques for copy protecting optical discs. For example, WO 00/74053 proposes copy protecting audio data on a digital audio compact disc (CD-DA) by rendering control data encoded onto the disc incorrect and/or inaccurate. The incorrect data encoded onto the CD is either inaccessible to, or not generally used by, a CD-DA player. Therefore a legitimate audio CD can be played normally on a compact disc music player, but the incorrect data renders the protected audio data on the CD unplayable by a CD-ROM drive.

As this earlier copy protection method prevents the user from using a CD-ROM drive legitimately simply to play the music or other audio on a CD-DA, alternative methods of copy protection have been proposed which, whilst preventing the production of usable copy discs, do not prevent or degrade the playing of legitimate optical discs on all players having the functionality to play such optical discs. Examples of such copy protection methods are described in WO 01/61695 and in WO 01/61696.

These further methods remove, corrupt, or otherwise render inaccurate control data associated with the information on the disc.

It has been found that there are many ways to deliberately subvert the content and/or the control data carried on an optical disc such that the disc cannot be reliably read or copied. However, there is a risk that the more effective the copy protection, the greater is the likelihood that the copy protection will adversely interfere with legitimate uses of the copy protected optical disc.

SUMMARY OF THE PRESENT INVENTION

The present invention seeks to provide a copy protection method in which this risk of interference with a legitimate use is reduced.

According to a first aspect of the present invention there is provided a copy protected optical disc carrying content and control data arranged in physical sectors, the control data including addresses of the physical sectors for providing access to the content, wherein a genuine region is provided on the disc which extends over at least part of a physical sector and which contains genuine data, wherein a subversive region is also provided on the disc to extend over at least part of a physical sector, the subversive region being similar in structure to the genuine region but containing false data, and wherein the subversive region has physical sector addresses which coincide with physical sector addresses of the genuine region.

The subversive region and/or the genuine region on the disc may extend over only part of a single physical sector. Generally, however, each of these regions will extend over one or more physical sectors.

Preferably, the physical sectors are arranged along a spiral track which extends between a central region of the disc and its periphery, the subversive and genuine regions are arranged along the spiral track, and a buffer region is interposed between the subversive and genuine regions. Generally, the subversive, buffer and genuine regions will be arranged consecutively along the spiral track.

The provision of an interposed buffer region helps to ensure that during normal use of the disc, for example, play of the disc, the false data in the subversive region is not accessed.

For a disc having a spiral track which extends from the central region of the disc towards its periphery, the subversive region is preferably arranged in front of the genuine region in the direction of the spiral track as it extends from the central region to the periphery. This helps to ensure that a copying device accessing the data on the disc in a linear manner will access the false data rather that the genuine data.

The false data in the subversive region may be one or more of buffering data, incorrect data, dummy data, unreadable data, and subversive data.

In this respect, the false data might simply be blank content or content which is incorrect for the particular disc. It will then be possible to copy the disc but the copied disc will have blank or incorrect content. Alternatively, the false data in the subversive region may be chosen to cause problems for a copying device trying to copy the disc such that copying of the disc is either slowed considerably or is prevented.

In a preferred embodiment, the content is arranged in a data area provided between a Lead-In and a Lead Out, the data area comprising a hierarchical data structure having several levels and having navigational data associated with the individual levels, and the subversive and genuine regions are located in one of the levels and each has a structure compliant with the structure of regions of data at that level.

For example, the optical disc is provided with navigational data for addressing content in the data area by reference to the addresses of the physical sectors, and the level at which the subversive and genuine regions are located may also include navigational data for navigating that lower level.

The navigational data for navigating the level in which the subversive and genuine regions are located preferably includes navigational data for addressing content at that level by reference to relative logical addresses of the physical sectors. This enables the disc to be played normally even though the subversive and genuine regions have coincident physical sector addresses. Thus, access to the genuine region can be had by addressing initially either a region outside of the subversive and genuine regions, or part of the genuine region which does not have a coincident physical sector address. Thereafter, navigation to the start of the genuine region can be achieved by calculating the distance to the start of the genuine region from the current position. This is referred to in the specification and claims as navigation by relative logical addresses.

The navigation provided not only enables access to the genuine region, but renders the false data invisible to a player during normal playback of the disc.

In one embodiment, said navigational data is arranged to address the outside region before the genuine region. The genuine region may follow the subversive region and the outside region may follow the genuine region. This also helps to ensure that during normal play of the disc, the false data is not accessed.

The location for the subversive and genuine regions may be chosen as is required and at the level required. In one preferred embodiment, both the genuine region and the subversive region comprise a video title set (VTS), and the physical sector addresses at the start of the genuine VTS and at the start of the subversive VTS are the same.

Preferably, the genuine VTS follows the subversive VTS, and a further VTS is provided which follows the genuine VTS.

For example, a video manager (VMG) containing navigational data for addressing the VTSs may be arranged initially to address the further VTS following said genuine and subversive VTSs. If then the navigational data addresses the start of the genuine VTS, access to the start of the genuine VTS can be readily obtained.

Additionally and/or alternatively, both the genuine region and the subversive region comprise one or more cells of a video object (VOB), and the physical sector addresses at the start of the genuine cells and at the start of the subversive cells are the same.

For example, the genuine cells may follow the subversive cells, and one or more further cells may be provided which follows the genuine cells.

In one embodiment, a program chain in a video title set (VTS) contains pointers addressing coincident physical sector addresses shared by subversive and genuine regions. The region accessed during playing or copying will depend upon the navigation path followed previously by the player or copying device.

The program chain in the video title set (VTS) may be arranged initially to address the one or more further cells following the genuine and subversive cells, and navigational data may then cause the program chain to address the start of the genuine cells during normal play of the disc.

Physical sectors within each said subversive region may be omitted such that the size of the subversive region is smaller than that of the genuine region. This ensures that the subversive region(s) do not take up too much space on the disc. In addition, if the subversive regions are constrained in size it is easier to ensure that they can be jumped over during normal play of the disc.

In one embodiment, the false data in the subversive region includes or comprises data patterns chosen to cause DSV problems.

Examples of DSV patterns, and their uses, are described, for example, in earlier application No. WO 02/11136.

In an embodiment, the data patterns are chosen to ensure that the DSV has a significant absolute value.

Additionally and/or alternatively, the data patterns are chosen to produce a DSV which has a rapid rate of change.

The false data in the subversive region may additionally and/or alternatively include or comprise information bits or sectors of information bits whose information content has been rendered incorrect.

The present invention also extends to a method of copy protecting an optical disc carrying content and control data arranged in physical sectors, the control data including addresses of the physical sectors for providing access to the content, the method comprising:

providing on the disc a genuine region which contains genuine data and which extends over at least part of a physical sector, also providing on the disc a subversive region which extends over at least part of a physical sector, the subversive region being similar in structure to the genuine region but containing false data, and arranging for the subversive region to have physical sector addresses which coincide with physical sector addresses of the genuine region.

In an embodiment, the physical sectors are arranged along a spiral track extending between a central region of the disc and its periphery, and the method comprises arranging the subversive and genuine regions along the spiral track, and interposing a buffer region between the subversive and genuine regions. Generally, the subversive and genuine regions will be arranged consecutively along the spiral track.

Additionally and/or alternatively, the method may comprise arranging the subversive and genuine regions along the spiral track, and, where the spiral track extends from the central region of the disc towards its periphery, arranging the subversive region in front of the genuine region in the direction of the spiral track from the central region to the periphery.

In a preferred embodiment, the false data in the subversive region is one or more of buffering data, incorrect data, dummy data, unreadable data, and subversive data.

Preferably, each of the subversive and genuine regions extends over one or more physical sectors.

In a preferred embodiment, the content is arranged in a data area provided between a Lead-In and a Lead-Out, the data area comprising a hierarchical data structure having several levels and having navigational data associated with the individual levels, and a method of an embodiment of the invention further comprises locating the subversive and genuine regions in one of the levels with each region having a structure compliant with the structure of regions of data at that level.

Where the optical disc is provided with navigational data for addressing content in the data area by reference to the addresses of the physical sectors, the method may further comprise including in the level in which the subversive and genuine regions are located navigational data for navigating that level.

Preferably, the navigational data for navigating the level in which the subversive and genuine regions are located includes navigational data for addressing content at that level by reference to relative logical addresses of the physical sectors.

In an embodiment, a method of the invention further comprises locating in the level in which the subversive and genuine regions are located a region outside of the subversive and genuine regions, and arranging that navigational data at that level, when addressing the level initially, is arranged to address said outside region.

In an embodiment, a method of the invention further comprises arranging the navigational data to address the outside region before the genuine region. For example, the genuine region may follow the subversive region and the outside region may follow the genuine region.

In a preferred embodiment, which is particularly relevant to DVD-Video, both the genuine region and the subversive region comprise a video title set (VTS), and the method further comprises arranging the physical sector address at the start of the subversive VTS to be the same as the physical sector address at the start of the genuine VTS.

Preferably, the genuine VTS follows the subversive VTS, and a further VTS is provided which follows the genuine VTS, and a Video Manager (VMG) containing navigational data for addressing the VTSs is provided and is arranged initially to address the further VTS following the genuine and subversive VTSs, and then to cause the start of the genuine VTS to be addressed.

Additionally and/or alternatively, both the genuine region and the subversive region comprise one or more of a video object (VOB), and the method further comprises arranging for the physical sector address at the start of the one or more subversive cells to be the same as the physical sector address at the start of the one or more genuine cells.

For example, the genuine cells may follow the subversive cells, and one or more further cells may be provided which follow the genuine cells.

In an embodiment, a program chain in a video title set (VTS) contains pointers addressing coincident physical sector addresses shared by subversive and genuine regions. The program chain in a video title set (VTS) may be arranged initially to address the start of the genuine cells during normal play of the disc. This will depend upon the navigation path followed previously by the player.

To ensure that the subversive regions do not take up too much space on the copy protected optical disc, the method may further comprise omitting physical sectors within the subversive region such that the size of the subversive region is smaller than that of the genuine region.

Preferably, the method further comprises including data patterns, which have been chosen to cause DSV problems, in the false data in the subversive region.

Where the data patterns have been chosen to cause DSV problems, the data patterns may be chosen to ensure that the DSV has a significant absolute value. Additionally and/or alternatively, the data patterns may be chosen to produce a DSV which has a rapid rate of change.

Additionally and/or alternatively, the method may further comprise including information bits or sectors of information bits, whose information content has been rendered incorrect, in the false data in the subversive region.

According to a further aspect of the present invention there is provided an instruction set for use in copy protecting an optical disc, the instruction set including:

instructions to form on a disc a subversive region which contains false data, but which subversive region is similar in structure to a genuine region containing genuine data, instructions to locate the genuine and subversive regions such that each extends over at least part of a physical sector on the disc, and instructions to give the genuine and the subversive regions coincident physical sectors addresses.

For example, the location instructions may be arranged to locate the genuine and subversive regions such that each extends over one or more physical sectors.

When the physical sectors are arranged along a spiral track which extends between the central region of the disc and its periphery, the instruction set may comprise instructions to arrange the subversive and genuine regions along the spiral track, and to interpose a buffer region between the subversive and genuine regions. Generally, the subversive, buffer and genuine regions will be arranged consecutively along the spiral track.

Additionally and/or alternatively, the instruction set may comprise instructions to arrange the subversive and genuine regions along the spiral track, and, where the spiral track extends from the central region of the disc towards its periphery, the instruction set may comprise instructions to arrange the subversive region in front of the genuine region in the direction of the spiral track from the central region to the periphery.

The false data in the subversive region may be one or more of buffering data, incorrect data, dummy data, unreadable data, and subversive data.

In an embodiment in which the content is arranged in a data area provided between a Lead-In and a Lead-Out, the data area comprising a hierarchical data structure having several levels and having navigational data associated with the individual levels, the instruction set may comprise instructions to locate the subversive and genuine regions in one of the levels and to give each said region a structure compliant with the structure of regions of data at that level.

For example, where navigational data is to be provided for addressing content in the data area by reference to the addresses of the physical sectors, and where the level at which the subversive and genuine regions are located also includes navigational data for navigating that level, the instruction set may comprise instructions for providing navigational data for navigating the level in which the subversive and genuine regions are located, which navigational data addresses content at that level by reference to relative logical addresses of the physical sectors.

Where both the genuine region and the subversive region comprise a video title set (VTS), the instruction set may comprise instructions to set the physical sector address at the start of the subversive VTS to be the same as the physical sector address at the start of the genuine VTS.

Preferably, where the genuine VTS follows the subversive VTS, and where a further VTS is provided which follows the genuine VTS, the instruction set may further comprise instructions to provide in a Video Manager (VMG) navigational data arranged initially to address the further VTS following the genuine and subversive VTSs, and then to address the start of the genuine VTS.

In a preferred embodiment, where both the genuine region and the subversive region comprise one or more cells of a video object (VOB), the instruction set may comprise instructions to set the physical sector address at the start of the subversive cells to be the same as the physical sector address at the start of the genuine cells.

Where the genuine cells follow the subversive cells, and where one ore more further cells are provided which follow the genuine cells, the instruction set may further comprise instructions to provide in a program chain in a video title set (VTS) pointers addressing coincident physical sector addresses shared by subversive and genuine cells.

DESCRIPTION OF PREFERRED EMBODIMENTS

The present invention is applicable to optical discs in general, but is described herein with reference to DVD formats.

The process for formatting the user data to be applied to a DVD is in accordance with agreed conventions and is well understood. However, for clarity, the manner in which the data is formatted according to the DVD standards will now be briefly described. This process is applicable to all formats of DVD.

Figure 1:
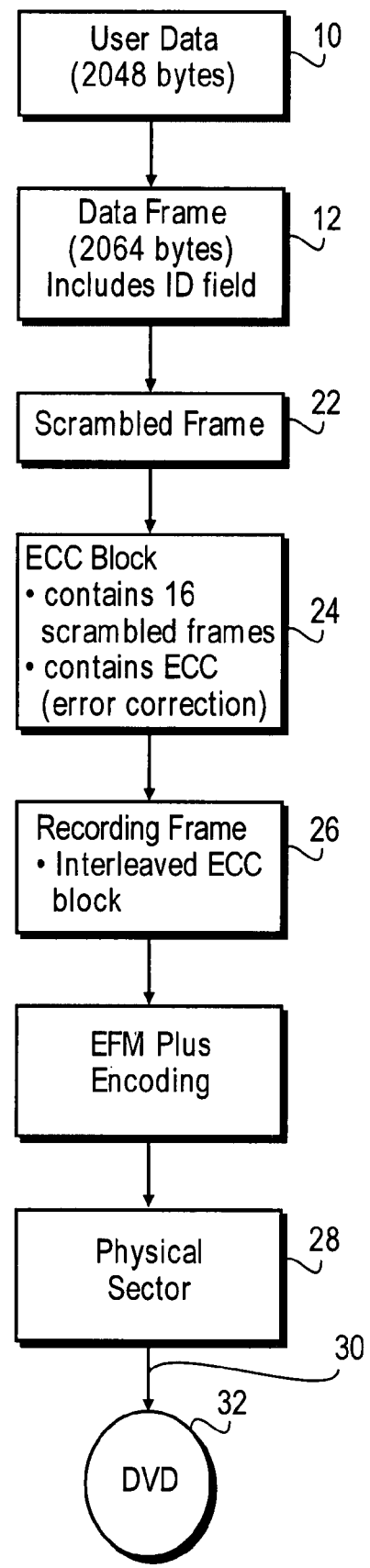
FIG. 1 shows schematically the writing of data to a DVD disc.

FIG. 1 shows the steps which are taken in formatting user data to be applied to a DVD. This user data is the information which is to be written to, and accessed from the disc and may comprise text, graphics, video, audio, programs and other content, and control data. As is indicated in FIG. 1, the user data is organised into blocks 10 which each contain 2,048 bytes. The first step in the formatting is to incorporate each block 10 of user data into a corresponding data frame 12 which has 2,064 bytes. The additional bytes incorporate identification and error correction codes.

As is further shown in FIG. 1, the data frame 12 is then scrambled to form a scrambled frame 22. This scrambling is to remove repeated sequences of data. The scrambling may be performed by XORing sixteen consecutive data frames with a first table and then XORing the next sixteen consecutive data frames with a second table and so on. The scrambled frame 22, therefore, includes 16×16 data frames 12.

Next an ECC block 24 is formed by error correction encoding in which sixteen consecutive scrambled frames 22 are arranged into an array having 192 rows each containing 172 bytes. To each of the 172 columns, sixteen bytes of "outer parity" are added and to each of the resulting 208 rows ten bytes of "inner parity" are added. These parity bytes are error correction codes related to the data in the rows and columns by known and understood error correction techniques.

The ECC block 24 is then input to interleaving means to create sixteen recording frames 26. These recording frames 26 are created by interleaving rows from the ECC block 24. Thus, the 37,856 bytes contained in the ECC block 24 are rearranged into sixteen recording frames $R_0, R_1, \ldots R_{15}$ each of which has 2,336 bytes. Since each recording frame R has 182 columns there are sixteen recording frames each consisting of 13 rows.

Figure 2:
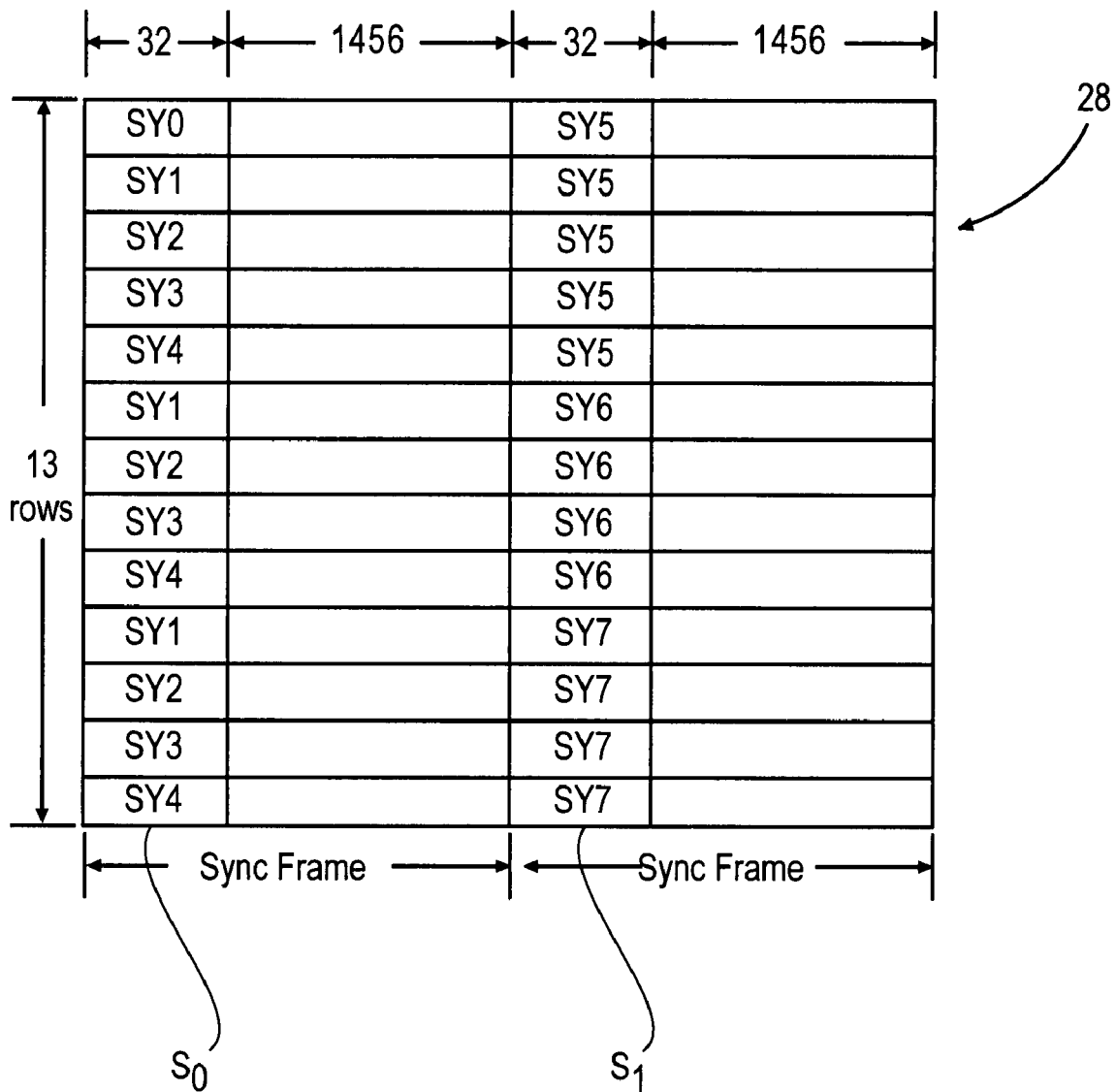
FIG. 2 shows a physical sector formed during formatting of the data to be written to a DVD disc.

The recording frames 26 are then subjected to EFM Plus encoding whereby a sequence of bits, that is, a series of 0s and 1s, is produced. Thereafter the data is arranged into sixteen physical sectors 28. One physical sector 28 is shown in FIG. 2. As can be seen, the EFM Plus encoded data from each recording frame is split down the middle and four byte sync codes $S_0$, and $S_1$ are inserted in front of each half row. Thereafter, the resulting sequence of bits 30 is applied to a disc 32.

EFM Plus encoding processes the data with 8 to 16 modulation, that is each eight bit byte is translated into a sixteen bit byte. This is done by selecting each sixteen bit code from a set of four tables. The encoding is arranged to maintain a low level of DSV (Digital Sum Value).

The bit stream 30 is written to the disc 32 by an appropriate mastering means to form pits and lands. In this respect, in a DVD writer the mastering means will generally be a laser beam recorder. Laser beam recorders are also used in mastering houses, but alternative mastering techniques are available and may be utilised.

Figure 3:
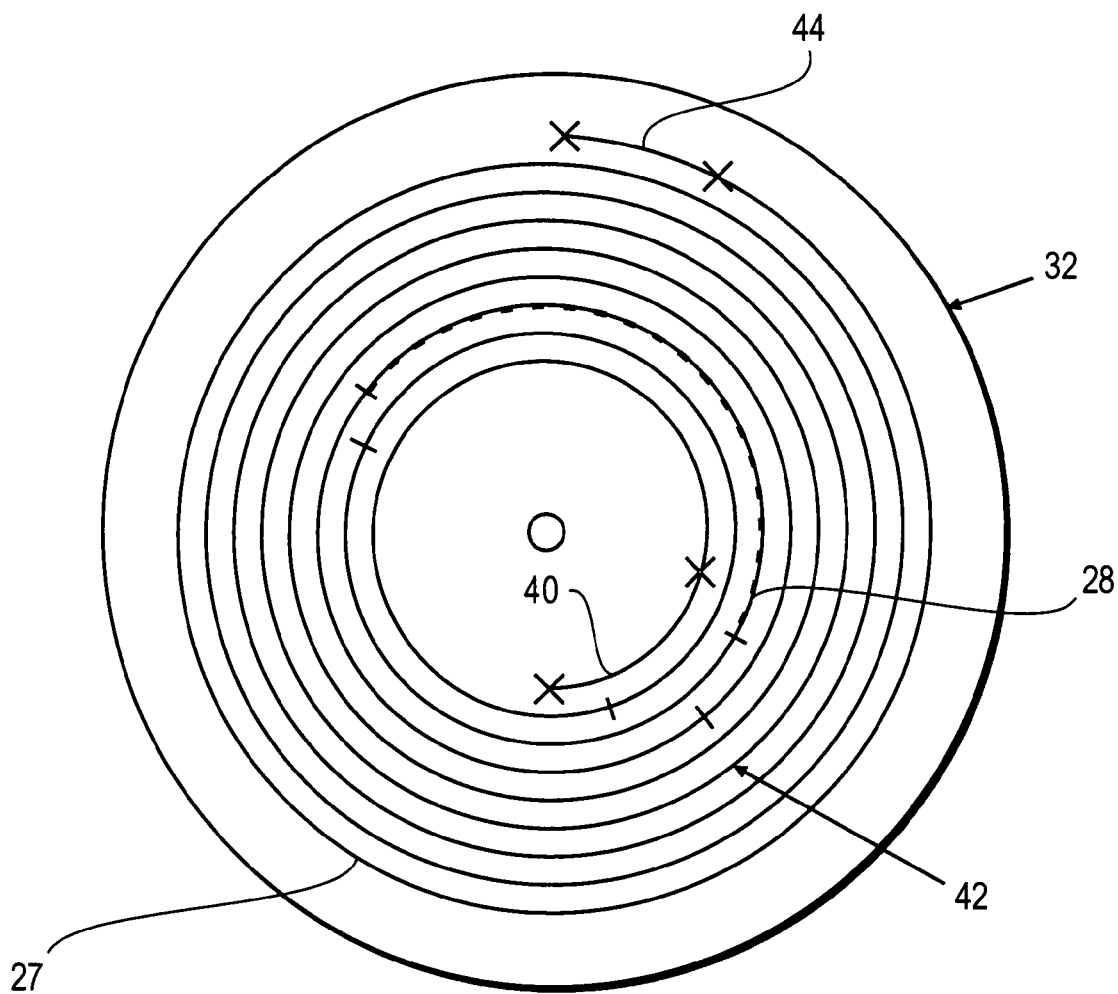
FIG. 3 shows schematically a spiral track formed on a DVD.

The pits and lands extend along a spiral track 27 formed on the surface of the disc 32 as is indicated in FIG. 3. This spiral track 27 extends from a central region of the disc 32 towards its periphery and is divided into a Lead-In 40, a data area 42, and a Lead-Out 44. As is also shown in FIG. 3, the data area 42 is divided into the physical sectors 28 which are generally arranged sequentially along the spiral track and have linearly increasing sector addresses.

It will be appreciated that optical discs are now available which have more than one layer and/or more than one spiral track. For example, double sided discs and dual layer discs are available, and there are also proposals to incorporate additional spiral tracks on a disc within the gap defined between the turns of the illustrated and existing spiral track 27. The present invention is applicable to all such discs but, for simplicity, is described herein with reference to a single layer disc having just a single spiral track.

Figure 4:
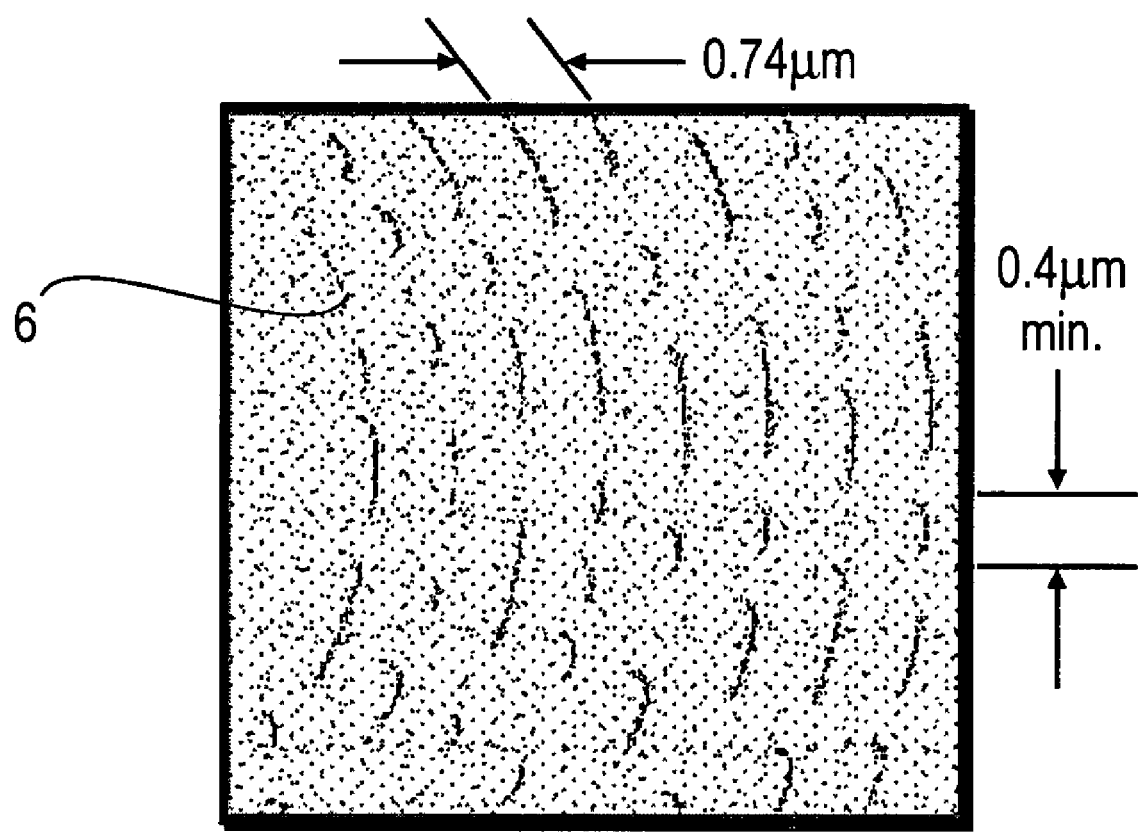
FIG. 4 shows an enlarged part of the surface of a DVD.

FIG. 4 shows an enlarged part of a DVD showing the pits 6 thereon. FIG. 4 shows that these pits extend along the spiral track 27 and are separated by lands.

The structure of the data on the DVD is the subject of standards, and is well known to those skilled in the art. Accordingly, only parts of the data structure of a DVD-Video which are relevant to the present invention are described and illustrated herein.

Figure 5:
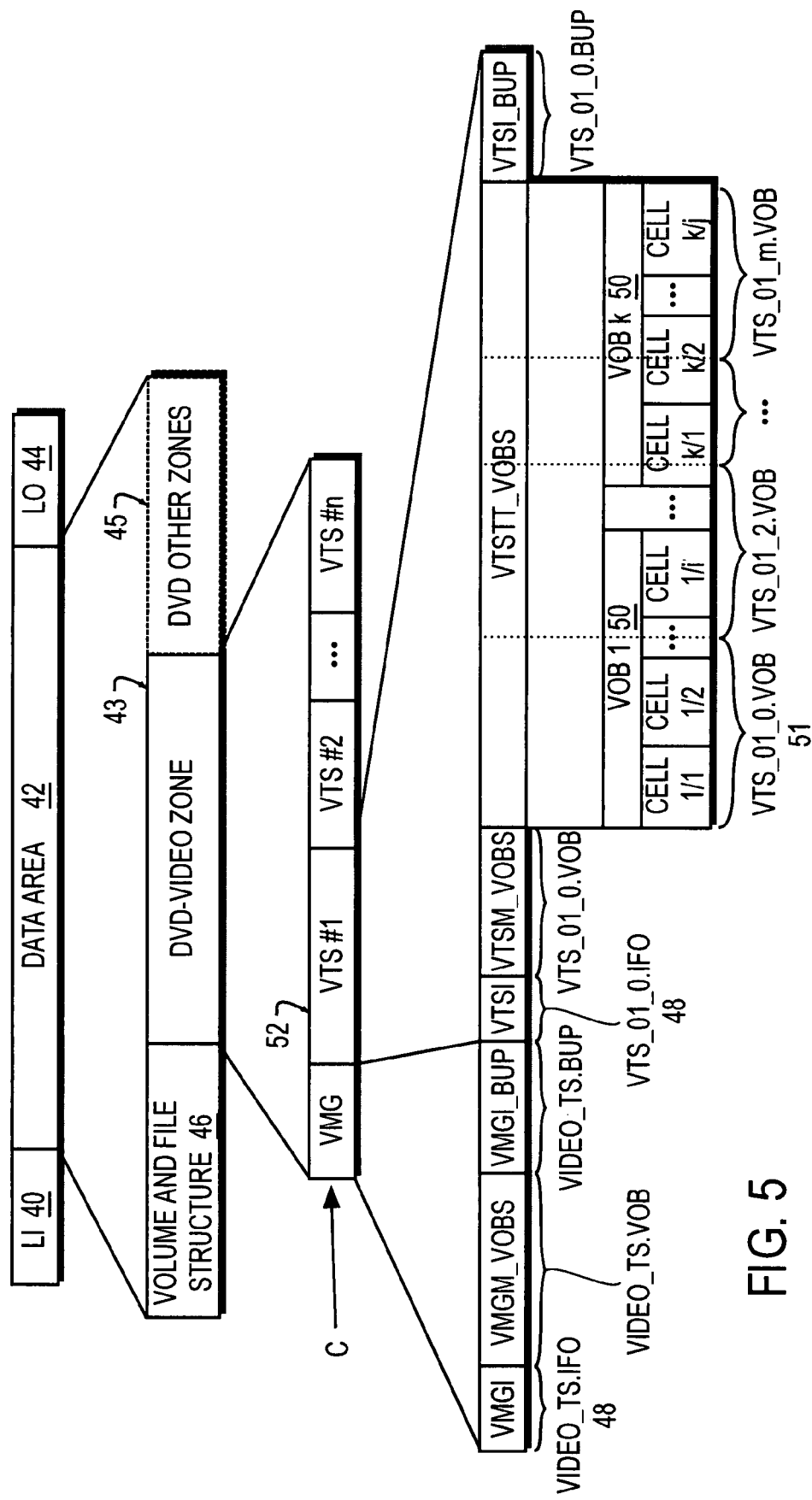
FIG. 5 shows the structure of data on a DVD.

FIG. 5 shows the data on a DVD structured to have the Lead-In 40, the data area 42, and the Lead-Out 44. The data area starts at logical sector number (LSN) 0 x 00, corresponding to physical sector number 0 x 3 00 00. FIG. 5 also indicates the hierarchical structure of the data on the DVD and indicates that the structure has several levels with navigational data associated with each individual level. The data area 42 is the highest level of the hierarchical structure. As is indicated in FIG. 5, the data area 42 includes a volume descriptor 46 which identifies the structure and contents of the data in the data area 42. This volume descriptor 46 is followed by a DVD-Video zone 43 and possibly by other DVD zones 45.

At the next level, the DVD-Video zone 43 comprises structures such as a Video Manager (VMG) and a number of video title sets (VTSs). Information files (IFO) 48 are provided in the Video Manager (VMG) and in each of the video title sets (VTSs) and provide the syntax by which navigation to video objects (VOBs) 50 is achieved. As is well known, a video object 50 contains MPEG streams, such as video, audio, and other content streams. The other content streams may comprise text and graphics, for example. A video object 50 also includes control data for controlling the presentation of its content together with control data enabling the data within the video object to be searched. The video objects 50 compose a set of video objects for the titles (VTSTT_VOBS) in video title set VTS 1. The VTSTT_VOBS is divided into video object files 51 whose size does not exceed 1 GB.

Figure 6:
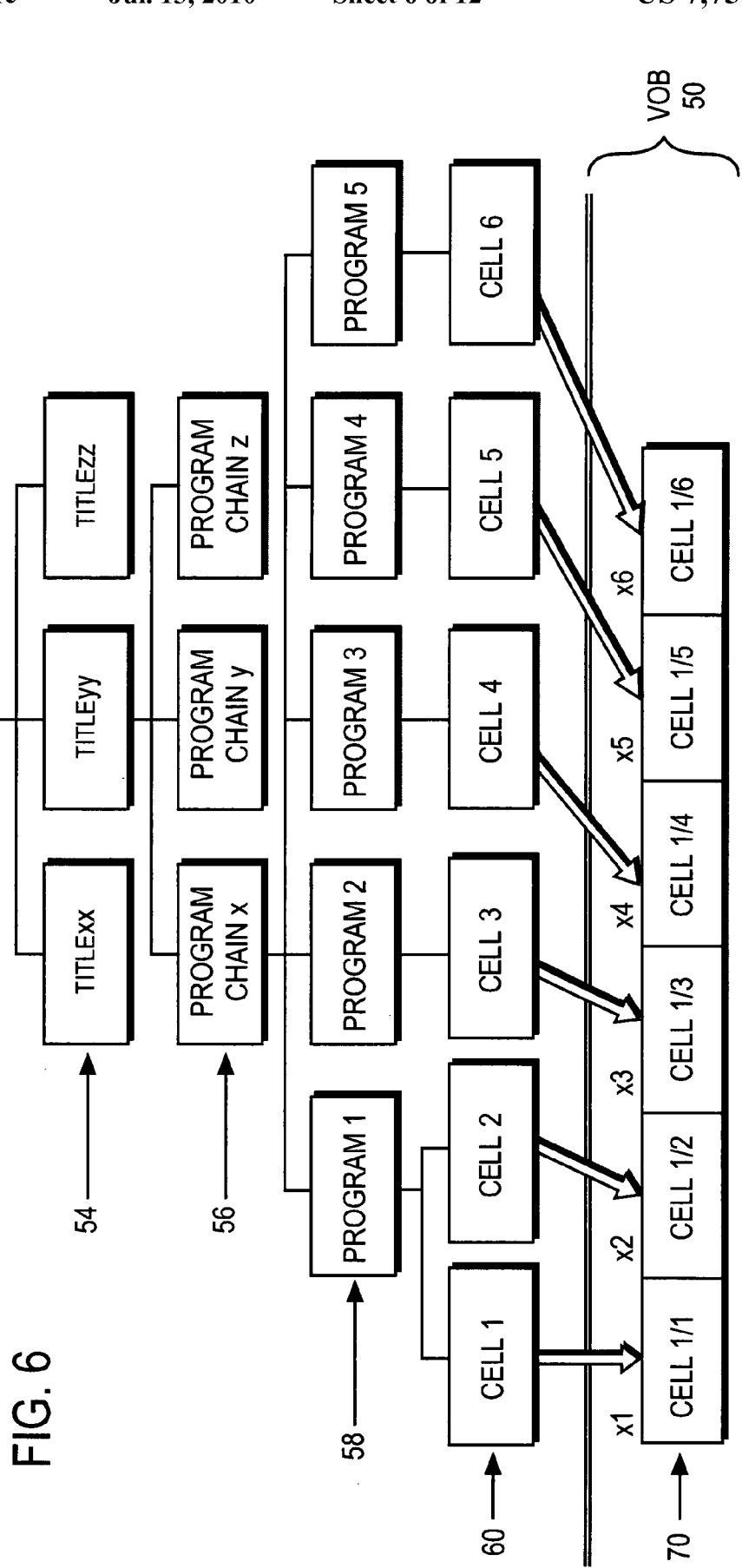
FIG. 6 shows the structure of a Video Title Set (VTS) in a DVD.

FIG. 6 shows the structure of a video title set (VTS) and illustrates how, in a DVD, a movie, for example, stored in a single video object 50, can be accessed and navigated and thereby played.

In FIG. 6, not all of the connections and pointers between the data in the DVD-Video structure have been illustrated. Instead, FIG. 6 illustrates how a single video object 50 is addressed.

In the structure illustrated in FIG. 6 there is a video title set (VTS) 52 containing a collection of titles 54. Each title 54 includes one or more program chains 56. In FIG. 6, the title 54 "TITLE yy" addresses the chosen video object 50 and does so by way of program chain x. Each program chain 56 includes a number of individual programs as 58 which are typically arranged to be played in sequence. Each of the programs 58 has one or more pointers as 60, and each pointer 60 addresses a particular part of the corresponding video object.

As is illustrated in FIG. 6, each video object 50 is divided into a number of individual cells 70. Typically, each of the programs 58 points, by way of its pointer 60, to an individual one of the cells 70 of the video object 50. However it is possible as also indicated in FIG. 6 for a single program 58, as program 1, to have more pointers 60, for example, two pointers which address two cells 70, as cells 1/1 and 1/2. The arrangement is generally that, as the programs 58 are played in sequence by way of the relevant program chain 56, the cells 70 within the video object 50 are similarly accessed in order.

Figure 7:
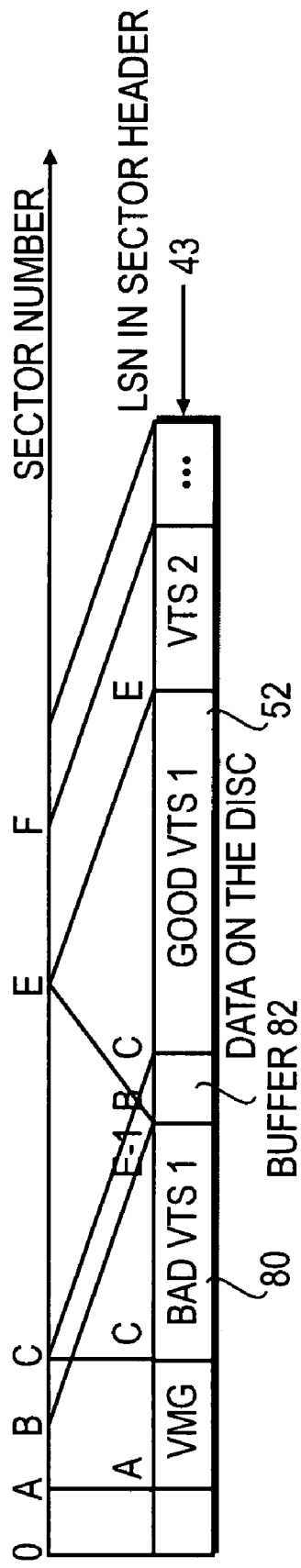
FIG. 7 illustrates the structure of a DVD-Video zone of a DVD which has been copy protected in accordance with the present invention.

FIG. 7 shows the structure of a DVD-Video zone 43 which has been copy protected in accordance with a method of the invention. It will be appreciated that FIG. 7 illustrates the level of the data structure marked C in FIG. 5.

For simplicity, the logical sector numbers (LSNs) rather than the physical sector numbers are indicated in the Figures. It will be appreciated that the physical sector addresses labelling each sector on a DVD disc are the actual physical sector numbers.

Embodiments of the copy protection technique of the present invention involve adding incorrect, dummy, unreadable or subversive data, generally referred to as false data, at a particular level in the hierarchical structure of the data area. Coincident or repeated physical sector addresses are provided for both genuine data and for the false data at the same level. If when reading the disc, the false data is encountered before the genuine data, the genuine data will be effectively hidden by the false data. This will happen, for example, if the content on the disc is navigated by physical sector addresses accessed in increasing order, as is common in many copying operations.

Thus, in the structure of the DVD-Video zone 43 as is illustrated in FIG. 7, it will be seen that a subversive region 80 has been incorporated in the zone 43 ahead of the first video title set VTS 1. This subversive region 80 has substantially the same structure as a genuine VTS 52. It is also apparent from FIG. 7 that a buffer region 82 has been interposed between the subversive region 80 and the genuine region 52 (VTS 1). In this respect, the subversive region 80 may be formed by copying a genuine region 52 and then making changes to it to provide the structure and content discussed below.

Figure 10:
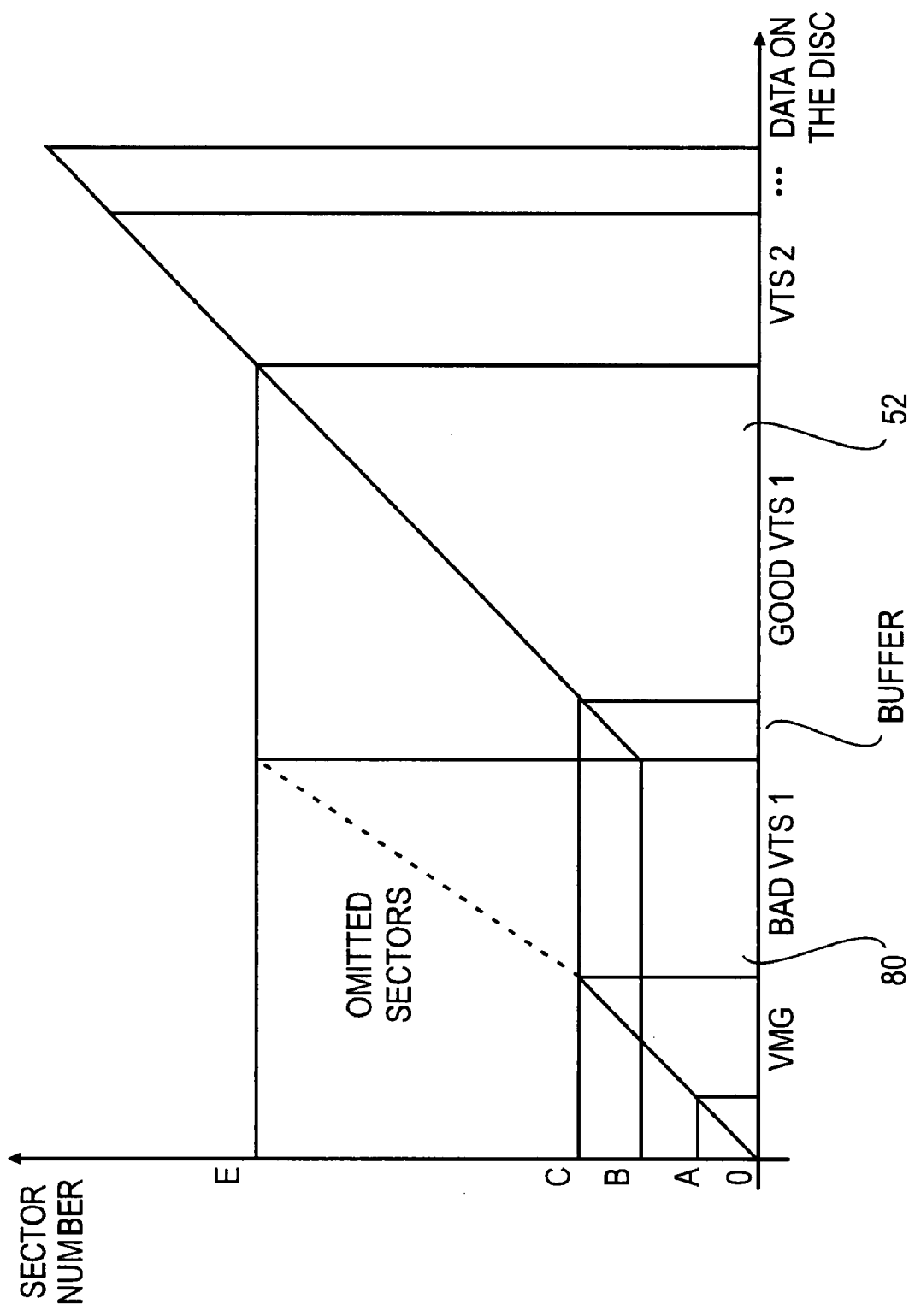
FIG. 10 is a graph illustrating the physical sector addresses of data in a DVD-Video zone as in FIG. 7.

In addition, and as is also apparent from FIG. 7, the subversive region 80 and at least part of the first genuine region 52 (VTS 1) are given the same or coincident physical sector addresses. That is, the sector numbers for the start of both the subversive region 80 and the start of VTS 1 are identical. In FIG. 7 the start sector addresses are each indicated as C. The end sector addresses of the subversive region 80 and of the genuine region 52 may be similarly identical as indicated in FIG. 10. However, and as is indicated on both FIG. 7 and FIG. 10, the subversive region 80 can be made to have a smaller size than the genuine region 52, for example, to save space on the disc. In that case, and as indicated in FIG. 10, sectors and their numbers, may be omitted from the subversive region 80.

Figure 8:
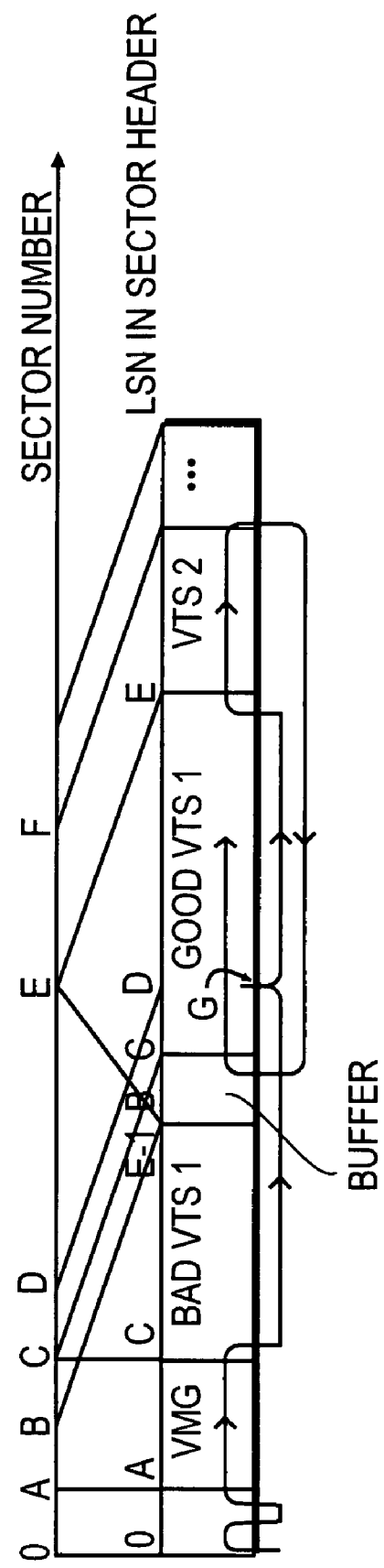
FIG. 8 is a view similar to that of FIG. 7 but indicating the navigation of the DVD-Video zone during playing.

FIG. 8 indicates the navigation of the DVD-Video zone 43 of FIG. 7 by a player. As previously, the player will navigate initially to the volume directory 46 and then to the VMG. However, there is included in the VMG an instruction to navigate first to the commencement of the second VTS, VTS 2, which begins at sector number E. At this level, further navigation is generally done by way of relative logical addresses. The player addressing VMG calculates where E is likely to be relative to its position at or near A in VMG. This will cause navigation over the subversive region and to an area within the first genuine VTS 1 as indicated by the spike G. However, on arriving at G it will be appreciated that instead of accessing a sector corresponding to logical sector number E only a sector corresponding to logical sector number D has been accessed, where D is smaller than E. Therefore navigation will continue to logical sector number E and then to the start of VTS 2. The navigation structure is such that, after accessing VTS 2, VTS 1 starting at logical sector number C has to be presented. Here, the player will again navigate by using logical addresses and will arrive approximately at logical sector number C within the genuine region by virtue of the calculation it makes of the relative distance from E to C. It will therefore be seen that the player avoids accessing the subversive region 80 and reliably accesses the genuine first VTS, VTS 1. It will also be apparent from FIG. 8 that the buffer region 82 is helpful in ensuring that the player is not adversely affected by the false data in the subversive region 80.

Figure 9:
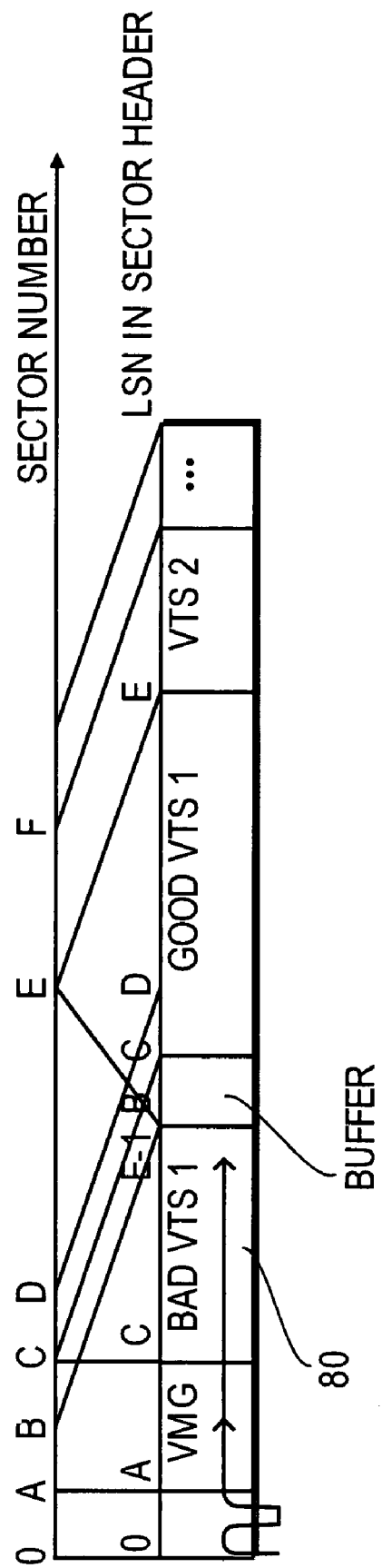
FIG. 9 shows navigation of a DVD-Video zone as in FIG. 7 during a sector-by-sector copying operation.

FIG. 9 shows the navigation of the copy protected DVD-Video zone 43 on a sector-by-sector basis. In this respect, a copying device performing a copy operation will usually access each sector in turn by use of the physical sector addresses. As is indicated in FIG. 9, the copying device will navigate using physical sector addresses to the volume directory 46 which then indicates the start, at sector number A, of the VMG of the DVD-Video zone to be addressed. The navigational information in the VMG includes the start sector number of all of the VTSs and will identify sector number C as the start of the first VTS. A copying device seeking to access VTS 1 will read the start sector number for VTS 1, sector number C, from the VMG and will then proceed to access sector number C. As the subversive region 80 is in front of the first genuine VTS, the copying device will access the start of what, in the structure of FIG. 7, is the subversive VTS 80. If the false data in the subversive VTS 80 is subversive then access to and copying of the data in the subversive region 80 may be prevented. Alternatively, the subversive region 80 may include dummy data which will be copied during a copying operation. However, there will be no navigation from region 80 to the first genuine VTS which also begins at sector number C whereby the content of VTS 1 will be hidden from the reader.

Embodiments of this copy protection technique provide additional or altered navigation data on the disc such that the subversive region 80 is not encountered during normal play of the disc.

It will be appreciated from the above, therefore, that with appropriate navigation, a player can reliably access the content of a disc modified as indicated in FIG. 7. However, a copying device accessing the disc by accessing increasing physical sector addresses, as in many copying operations, will not access the genuine data of VTS 1 which is hidden by the subversive region. Furthermore, the use in the subversive region 80 of false data which is subversive can cause a copying operation to be particularly slow or to fail, whilst the provision in the subversive region of incorrect or dummy data can cause a copying operation to result in valueless and/or meaningless copied content.

FIG. 5 shows that the data in the data area 42 is arranged in a hierarchical structure having various levels and one or more subversive regions as discussed above may be inserted at any of the levels. The subversive region may have substantially the same structure as a genuine region at the level concerned, and generally genuine and subversive regions will have coincident physical sector addresses, at least at the start of each region. Furthermore, the programs used for playing the disc will need to navigate to the start of the genuine regions by way of relative logical sector addresses such that genuine regions are not hidden from a player.

Figure 11:
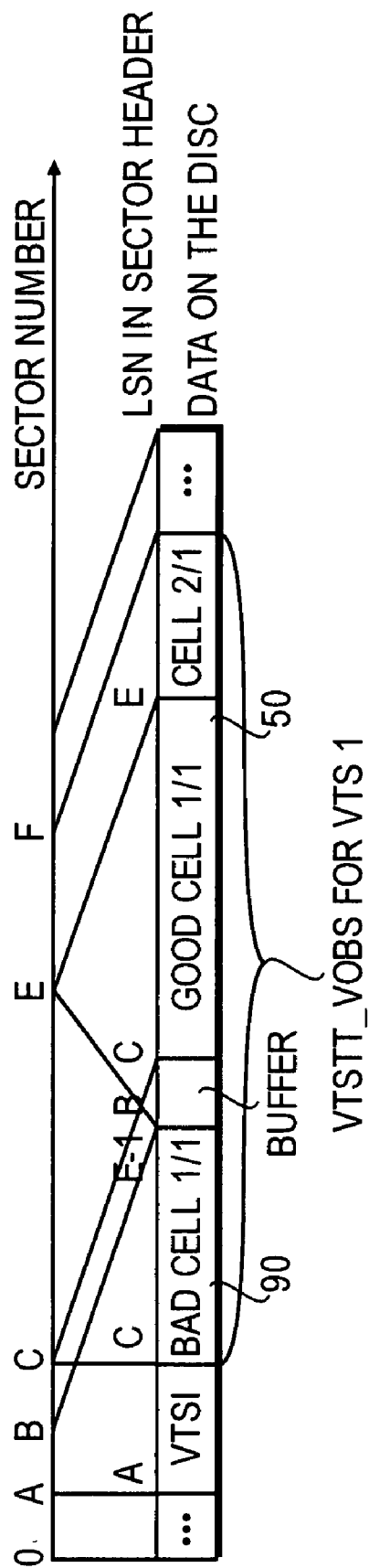
FIG. 11 illustrates the structure of VTSTT_VOBS for VTS 1 of a DVD which has been copy protected in accordance with the present invention.
Figure 13:
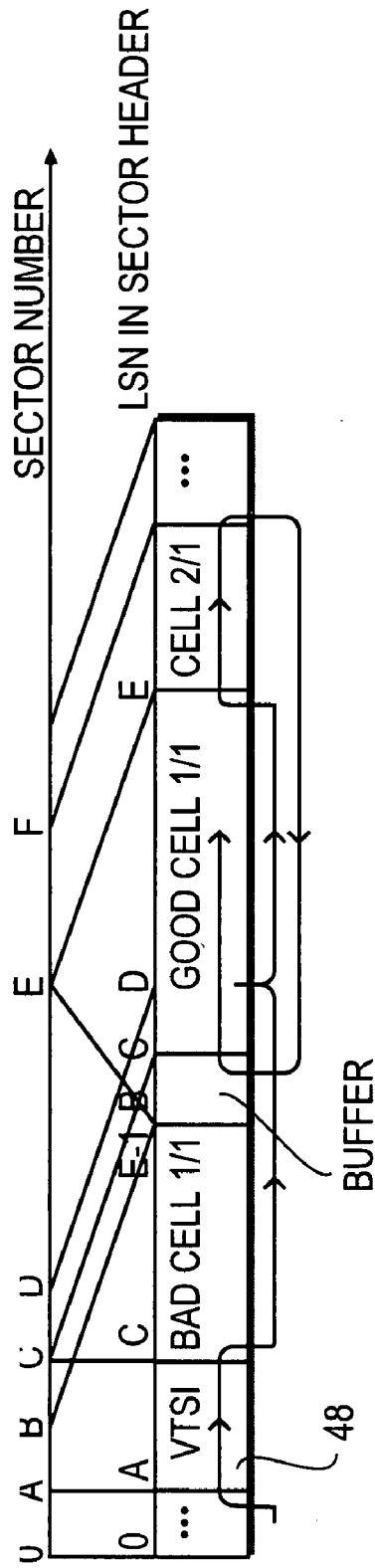
FIG. 13 indicates the navigation of the VTSTT_VOBS of FIG. 11 during playing of the disc.
Figure 14:
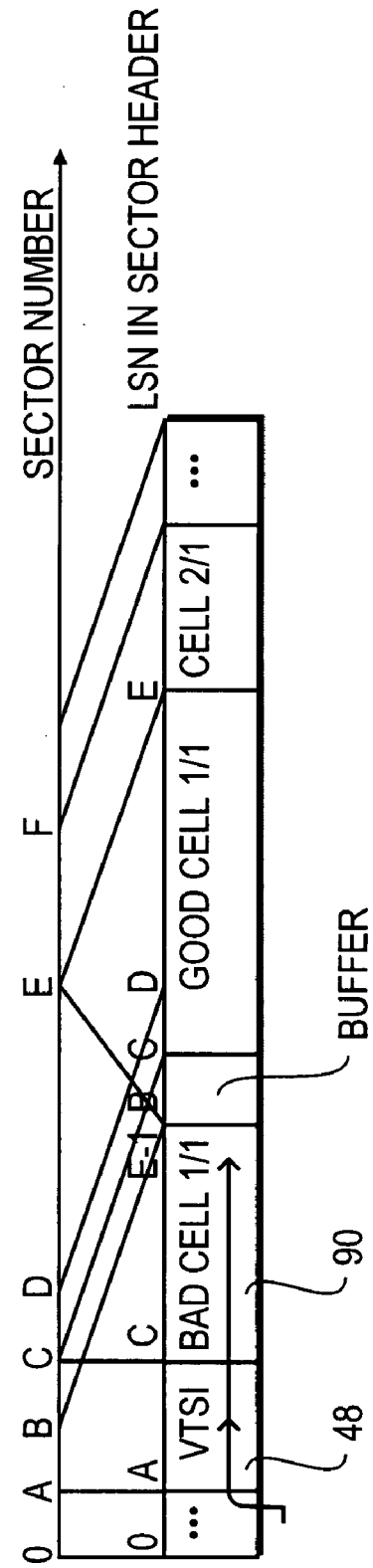
FIG. 14 shows navigation of the VTSTT_VOBS of FIG. 11 during a sector-by-sector copying operation.

FIG. 11 shows the incorporation of a subversive single cell 1/1 90 in VTSTT_VOBS for VTS 1. As previously, the subversive cell 1/1 90 is arranged in front of the genuine cell 1/1 and both the subversive cell 90 and the genuine cell 1/1 have the start address sector number C. Both the subversive and genuine cells end at sector number E, but sectors are preferably omitted in the subversive cell 90. In this case, and as is well known, navigation of VTSTT_VOBS is by way of information obtained from the VTS information (VTSI) 48 for VTS 1 (FIG. 5). As previously, the navigation is arranged such that cell 2/1 is presented first and then by use of relative logical addresses the genuine cell 1/1 is to be presented. So the navigation addresses first the start of cell 2/1 and then by relative logical addresses, that is by the calculation of relative distances, the start of the genuine cell 1/1 is addressed according to the navigation data within a program chain. This navigation is illustrated in FIG. 13. Similarly, because a copying device will generally seek to copy a disc by sequentially accessing physical sector addresses or by directly accessing the title containing the main presentation data (Title 2 in FIG. 12), a copying device will access the start of VTSI 48, and then the start of the subversive cell 90, whereby the genuine cell 1/1 will be hidden from a copying operation. The navigation during a sector-by-sector copying operation is shown in FIG. 14.

Figure 12:
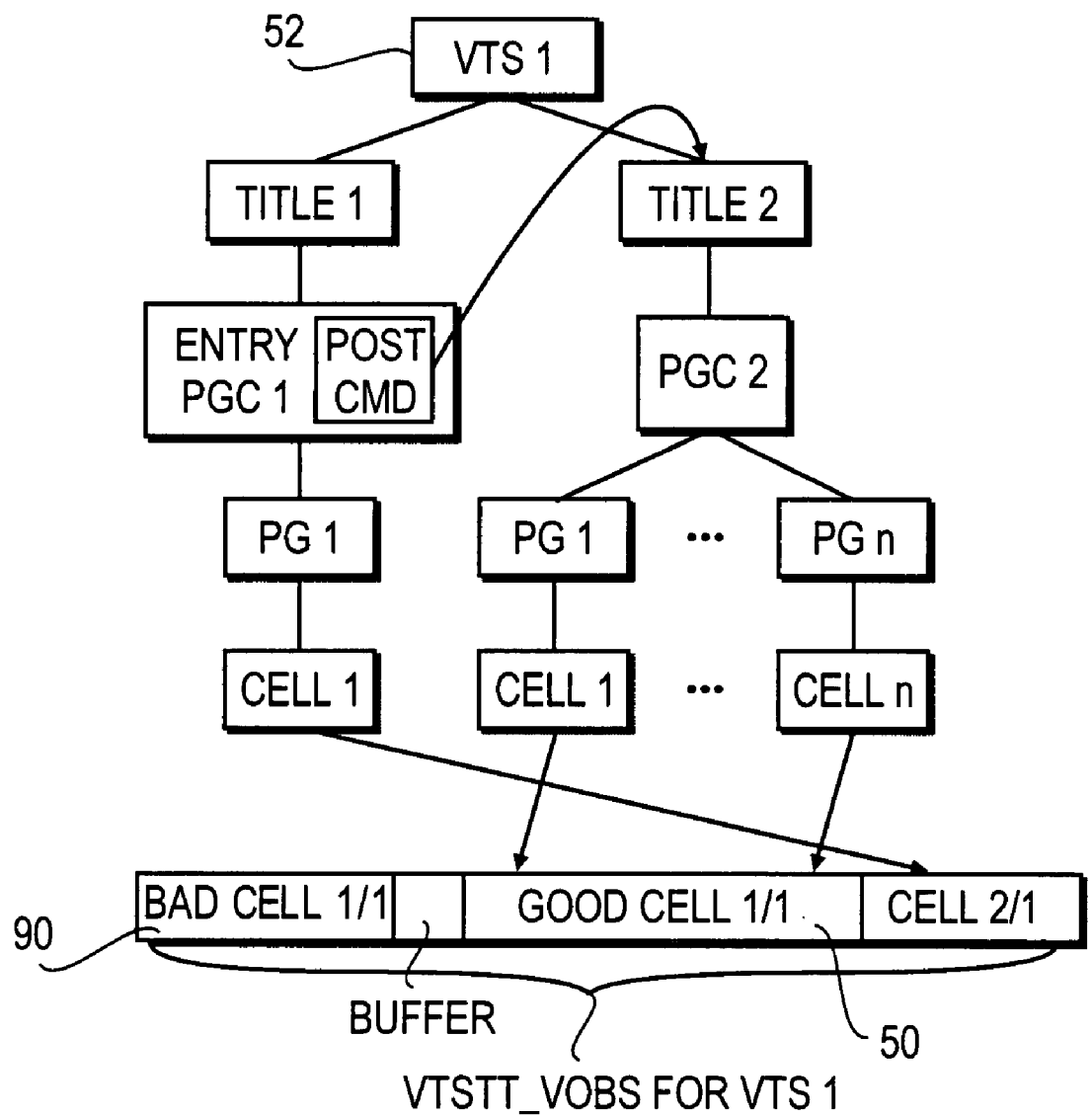
FIG. 12 illustrates the structure of VTS 1 of FIG. 11.

FIG. 12 shows the program chains for VTS 1 and shows in more detail the navigational structure for VTSTT_VOBS of FIG. 11. It will be seen that during presentation of Title 1 within video title set VTS 1, the cell 2/1 is accessed. There is then a post command, arising during execution of program chain PGC1, which links to Title 2 and points to the genuine cell 1/1. During normal playback of the disc, the navigational structure illustrated will access the genuine cell 1/1. In this arrangement, the content to be copy protected will be within Title 2. Preferably, Title 1 has a presentation time which is shorter than that of Title 2.

The embodiment illustrated in FIGS. 11 and 12 can defeat copying devices which operate on a sector-by-sector or file-by-file basis. The embodiment can also defeat copying devices (sometimes referred to as IFO parsing copying devices) which select, and attempt to copy, only the main title.

In both of the embodiments described above, access to the genuine content is by way of a second and subsequent genuine region, namely VTS 2 in FIG. 7 and cell 2/1 in FIG. 12. These regions may include content which is generally played first, such as a copyright warning, or may simply include a few seconds of black video, for example. Once the content in VTS 2 or cell 2/1 has been played, the program navigates the player to the commencement of either the genuine VTS 1 or the genuine cell 1/1.

As set out above, the start of the genuine regions, namely VTS 1 and cell 1/1, have identical sector numbers to the sector numbers assigned to the start of the corresponding subversive regions. Similarly, the end of each genuine region may have a sector number which coincides with the sector number at the end of the corresponding subversive region. However, each subversive region may have omitted sectors such that there will be sector numbers within the genuine regions which are not repeated in the subversive regions.

We have seen that the false data in the subversive regions may be incorrect or dummy data, or alternatively or additionally it may be unreadable or subversive data. When subversive data is to be used this may be any data which will stop or subvert a copying device reading or playing the content of the subversive region on an optical disc, and/or will stop or significantly slow down the copying of data from the optical disc and/or will prevent usable copies of data on the disc being made. Examples of subversive data which meet these requirements include data with incorrect error correcting codes, and information which has been deliberately altered. The data might be, or include, data patterns chosen to cause DSV problems, for example, chosen to ensure that the DSV has a significant absolute value and/or that the DSV has a rapid rate of change. A description of DSV data patterns and the problems they cause is given, for example, in WO 02/11136. It is additionally and/or alternatively possible to provide data which has mistimed waveform transitions.

In the main, it is expected that values of the data, which may be content and/or control data, will be changed during encoding of the data onto the optical disc whereby the subversive data is produced. However, it is additionally and/or alternatively possible to provide subversive data on the optical disc by mechanically or physically damaging bits or sectors of bits on the disc.

Examples of data which has been altered, and which can therefore provide subversive data for use in embodiments of the invention are described, for example, in WO 00/74053, WO 01/61695 and WO 01/61696. Any or all of such subversive data may be used in embodiments of the present invention.

Of course, subversive data can cause problems for a device seeking to play or otherwise use an optical disc for legitimate purposes. Thus, in the embodiments described above, buffer regions have been interposed between subversive and genuine regions to ensure that during normal use of the optical disc the subversive regions are not accessed. Similarly, and if required, buffering data may be incorporated into the subversive regions.

It will be appreciated that modifications of, and alterations to, the embodiments as described and illustrated may be made within the scope of this application as defined by the appended claims.

What is claimed is:

1. A copy protected optical disc carrying content and control data arranged in physical sectors, the control data including addresses of the physical sectors for providing access to the content, wherein a genuine region is provided on the disc which extends over at least part of a physical sector and which contains genuine data, wherein a subversive region is also provided on the disc to extend over at least part of a physical sector, the subversive region being similar in structure to the genuine region but containing false data, and wherein the subversive region has physical sector addresses which coincide with physical sector addresses of the genuine region.

2. A copy protected optical disc according to claim 1, wherein the physical sectors are arranged along a spiral track which extends between a central region of the disc and its periphery, wherein the subversive and genuine regions are arranged along the spiral track, and wherein a buffer region is interposed between the subversive and genuine regions.

3. A copy protected optical disc according to claim 1, wherein the false data in the subversive region is one or more of:
   buffering data, incorrect data, dummy data, unreadable data, and subversive data.

4. A copy protected optical disc according to claim 1, wherein the content is arranged in a data area provided between a Lead-In and a Lead Out, the data area comprising a hierarchical data structure having several levels and having navigational data associated with the individual levels, and wherein the subversive and genuine regions are located in one of the levels and each has a structure compliant with the structure of regions of data at that level.

5. A copy protected optical disc according to claim 4, including navigational data for addressing content in the data area by reference to the addresses of the physical sectors, wherein the level at which the subversive and genuine regions are located includes navigational data for navigating that level, and wherein the navigational data for navigating the level in which the subversive and genuine regions are located includes navigational data for addressing content at that level by reference to relative logical addresses of the physical sectors.

6. A copy protected optical disc according to claim 5, wherein the navigational data, when addressing initially the level in which the subversive and genuine regions are located, is arranged to address a region outside of the subversive and genuine regions, said navigational data being arranged to address the outside region before the genuine region.

7. A copy protected optical disc according to claim 1 or claim 4, wherein the false data in the subversive region includes or comprises data patterns chosen to cause DSV problems, and wherein said data patterns have been chosen to produce a DSV which has a rapid rate of change.

8. A method of copy protecting an optical disc carrying content and control data arranged in physical sectors, the control data including addresses of the physical sectors for providing access to the content, the method comprising:
   providing on the disc a genuine region which contains genuine data and which extends over at least part of a physical sector,
   also providing on the disc a subversive region which extends over at least part of a physical sector, the subversive region being similar in structure to the genuine region but containing false data, and
   arranging for the subversive region to have physical sector addresses which coincide with physical sector addresses of the genuine region.

9. A method of copy protecting an optical disc according to claim 8, wherein the physical sectors are arranged along a spiral track extending from a central region of the disc towards its periphery, the method comprising arranging the subversive and genuine regions along the spiral track, and interposing a buffer region between the subversive and genuine regions.

10. A method of copy protecting an optical disc according to claim 8, wherein the physical sectors are arranged along a spiral track extending between a central region of the disc and its periphery, the method comprising arranging the subversive and genuine regions consecutively along the spiral track.

11. A method of copy protecting an optical disc according to claim 8, wherein the false data in the subversive region is one or more of: buffering data, incorrect data, dummy data, unreadable data, and subversive data.

12. A method of copy protecting an optical disc according to claim 8, wherein the content is arranged in a data area provided between a Lead-In and a Lead-Out, the data area comprising a hierarchical data structure having several levels and having navigational data associated with the individual levels, and further comprising locating the subversive and genuine regions in one of the levels and with each region having a structure compliant with the structure of regions of data at that level.

13. A method of copy protecting an optical disc according to claim 12, wherein the optical disc is provided with navigational data for addressing content in the data area by reference to the addresses of the physical sectors, and further comprising including in the level in which the subversive and genuine regions are located navigational data for navigating that level, and wherein the navigational data for navigating the level in which the subversive and genuine regions are located includes navigational data for addressing content at that level by reference to relative logical addresses of the physical sectors.

14. A method of copy protecting an optical disc according to claim 13, further comprising locating in the level in which the subversive and genuine regions are located a region outside of the subversive and genuine regions, and arranging that navigational data at that level, when addressing the level initially, is arranged to address said outside region.

15. A method of copy protecting an optical disc according to claim 14, further comprising arranging the navigational data to address the outside region before the genuine region, and arranging said genuine region to follow said subversive region and said outside region to follow the genuine region.

16. A method of copy protecting an optical disc according to claim 8, further comprising including data patterns, which have been chosen to cause DSV problems, in the false data in the subversive region, wherein said data patterns have been chosen to produce a DSV which has a rapid rate of change.

* * * * *